US009760875B2

(12) United States Patent
Viner et al.

(10) Patent No.: US 9,760,875 B2
(45) Date of Patent: Sep. 12, 2017

(54) DEVICE AND METHOD FOR AUTOMATIC BILLING OF POWER CONSUMPTION THROUGH STREET POLES

(75) Inventors: Yehiel Viner, Shoam (IL); Amir Poznansky, Tel Aviv (IL)

(73) Assignee: MENOLINX SYSTEM LTD., Rishon Lezion (IL)

( * ) Notice: Subject to any disclaimer, the term of this patent is extended or adjusted under 35 U.S.C. 154(b) by 328 days.

(21) Appl. No.: 13/440,403

(22) Filed: Apr. 5, 2012

(65) Prior Publication Data
US 2013/0268433 A1  Oct. 10, 2013

(51) Int. Cl.
*G06Q 20/14* (2012.01)
*B60L 11/18* (2006.01)
*G07F 15/00* (2006.01)
*H05B 37/03* (2006.01)

(52) U.S. Cl.
CPC ........ *G06Q 20/145* (2013.01); *B60L 11/1809* (2013.01); *B60L 11/1816* (2013.01); *G07F 15/005* (2013.01); *H05B 37/032* (2013.01); *Y02T 10/7005* (2013.01); *Y02T 10/7072* (2013.01); *Y02T 90/128* (2013.01); *Y02T 90/14* (2013.01); *Y02T 90/16* (2013.01)

(58) Field of Classification Search
USPC .......... 705/35, 40; 320/104, 109; 701/1, 22; 315/312
See application file for complete search history.

(56) References Cited

U.S. PATENT DOCUMENTS

| | | | | |
|---|---|---|---|---|
| 5,297,664 A * | 3/1994 | Tseng | .................... | B60L 3/0069 194/217 |
| 8,305,032 B2 * | 11/2012 | McKenna | ...................... | 320/104 |
| 8,482,223 B2 | 7/2013 | Draper | | |
| 8,487,584 B2 * | 7/2013 | Taylor-Haw et al. | ........ | 320/109 |
| 2009/0082957 A1 * | 3/2009 | Agassi et al. | ................. | 701/208 |
| 2010/0013436 A1 * | 1/2010 | Lowenthal et al. | .......... | 320/109 |
| 2010/0250043 A1 * | 9/2010 | Scheucher | ................ | B60L 8/00 701/22 |
| 2010/0277072 A1 | 11/2010 | Draper | | |
| 2010/0283426 A1 * | 11/2010 | Redmann | ....................... | 320/109 |
| 2012/0229085 A1 * | 9/2012 | Lau | ..................... | B60L 11/1818 320/109 |
| 2012/0229089 A1 * | 9/2012 | Bemmel et al. | .............. | 320/109 |

(Continued)

OTHER PUBLICATIONS

"Power box", Wikipedia, Oct. 16, 2011, http://en.wikipedia.org/w/index.php?title=Power_box&oldid=455912306.*

(Continued)

*Primary Examiner* — Asha Puttaiah
(74) *Attorney, Agent, or Firm* — Paul D. Bianco; Stephen Bongini; Fleit Gibbons Gutman Bongini & Bianco PL (57) ABSTRACT

The present invention provides a system and method for automatic billing, managing, scheduling and power consumption controlling of charging process of electronic vehicle. The system is comprised of: street light poles which include: an electronic node, unique communication adapter and electronic socket for vehicles charging, a feeder pillar in the street comprising a concentrator for controlling and scheduling the power consumption of each street light pole in relation to charging process and a operation control center (OCC) for controlling and billing the power consumption of each street pole.

20 Claims, 5 Drawing Sheets

(56) References Cited

U.S. PATENT DOCUMENTS

2012/0268061 A1* 10/2012 Bhageria et al. ............. 320/107
2013/0211988 A1* 8/2013 Dorn et al. .................... 705/35

OTHER PUBLICATIONS

Royal Academy of Engineering, "Electric Vehicles: Charged with Potential" (http://www.raeng.org.uk/publications/reports/electric-vehicles) May 2010.*

* cited by examiner

DEVICE AND METHOD FOR AUTOMATIC BILLING OF POWER CONSUMPTION THROUGH STREET POLES

FIELD OF THE INVENTION

The present invention relates generally to methods and systems for power conduction of street lighting, and more specifically to methods and apparatus for DC charging for electric vehicles, through a street lighting pole, and automatic billing of the power consumption.

BACKGROUND OF THE INVENTION

Over the past few decades there has been a significant increase in the number of new systems for vehicles charging and billing collection of the power consumption. The known system implemented by a local communication from the electric socket to the operation control center (OCC) by TCP/IP line in order to manage the charging process and the customers' billing. Others were implemented by GPRS communication, through independent cellular modem from the electronic socket to the OCC.

Some patent publications in the field include: US patent application US2010/0277072A1 which is disclose a network controlled charge transfer device, for transferring charge, between a local power grid and an electric vehicle which is mounted to a street light. Some of the problems associated with this system are resulting from the communication technique based on local area networks (LAN), which is very expensive solution. The current invention communicates with the electric socket which is located at the poles, by independent communication network; base on PLC, TP or RF private network which is communicates directly to the concentrators that located at the feeder pillar and from the feeder pillar to the OCC by GPRS network.

SUMMARY OF THE INVENTION

The present invention provides a system for automatic billing, managing, scheduling and power consumption controlling of charging process of electronic vehicle. The system is comprised of: street light poles including an electronic node, unique communication adapter and electronic socket for vehicles charging, a feeder pillar in the street comprising a concentrator for controlling and scheduling the power consumption of each street light pole in relation to charging process and a operation control center (OCC) for controlling and billing the power consumption of each street pole.

The electronic nodes is mounted on the street lighting poles and is connected with concentrator through a first communication network and the feeder pillar communicates with the OCC through a second communication network to the.

According to some embodiments of the present invention the street pole further comprise a near field communication (NFC) unit for identifying the charged vehicle.

According to some embodiments of the present invention the first communication network between the electronic node and the concentrator is one of: RF communication, PLC communication or TP communication. According to some embodiments of the present invention the second communication network between the concentrator and the OCC is one of: wireless communication, TCPIP, or wired connection.

According to some embodiments of the present invention the electronic node is setting the precise power parameters for the specific electronic vehicle according to vehicle profile.

According to some embodiments of the present invention the system further comprise a control network for controlling the operation of the power supply to the street poles, wherein each electronic node has a unique ID.

According to some embodiments of the present invention the charging process is based on power supply provided for the lighting poles.

According to some embodiments of the present invention the charging process is based on power supply provided by unique DC power supply controlled by the electronic node.

According to some embodiments of the present invention the charging process is based on power supply provided by unique DC power supply controlled by the electronic nod, and select the proper pole for charging according to the power consumption of the whole supplying line.

According to some embodiments of the present invention the system further comprising an indicator module connected to each street pole for indicating if the street pole is ready for charging according to power consumption of the supply line connected to said street pole.

According to some embodiments of the present invention when the line is over loaded the OCC closes the electronic socket automatically.

According to some embodiments of the present invention indicator module is a light indicator changing its color according to power consumption status.

The present invention provides a method for automatic billing, managing, scheduling and power consumption controlling of charging process of electronic vehicles using street light poles, a feeder pillar, a designated control server. The method comprise the steps of: Identifying the vehicle profile and user/driver details, Communicating between the street pole and the designated sever though the feeder pillar using communication network for requesting authorization to the charge process, approving the charging process, controlling the charging process of plural vehicles connected to different street poles associated with one feeder pillar, by managing the power consumption of all street poles associated to the feeder pillar and billing the power consumption of each street pole by the designated sever. The electronic nodes are mounted on the street lighting poles and are associated with concentrator through a first communication network and the feeder pillar communicates with the OCC through a second communication network to the.

According to some embodiments of the present invention the street pole further identifies the charged vehicle by a near field communication (NFC) unit.

According to some embodiments of the present invention the electronic node and the concentrator communicate with one of RF communication, PLC communication or TP communication.

According to some embodiments of the present invention the concentrator and the designated server communicate by one of one of wireless communication, TCPIP, or wired connection.

According to some embodiments of the present invention the electronic node is setting the precise power parameters for the specific electronic vehicle.

According to some embodiments of the present invention the charging process is based on power supply provided for the lighting poles.

According to some embodiments of the present invention the charging process is based on power supply provided by unique DC power supply controlled by the electronic node.

According to some embodiments of the present invention the charging process is based on power supply provided by unique DC power supply controlled by the electronic nod, enabling to select the proper pole for charging according to the power consumption of the whole supplying line.

According to some embodiments of the present invention the method further includes the step of indicating if the street pole is ready for charging according to power consumption of the supply line connected to said street pole.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION OF PREFERRED EMBODIMENTS

In the detailed description, numerous specific details are set forth in order to provide a thorough understanding of the invention. However, it will be understood by those skilled in the art that these are specific embodiments and that the present invention may be practiced also in different ways that embody the characterizing features of the invention as described and claimed herein.

The present invention provides a charging system which utilizes a communication and control device which will be referred as "electronic node", which is installed in lighting poles. The electronic node enables to control the charging operation through an electronic socket of the pole which communicate with the ignition system in the pole, and managing the power consumption of the local ballast or driver of the street lights' lamp.

This operation mode of the electronic node improves the efficiency of the grid through the charging process, by controlling and scheduling the power of the ignition system of the streetlight, and the power consumption of the charging process, and setting the power consumption to optimal values.

The electronic node, further enables to identify the charged vehicles by Near Field Communication unit (NFC). The electronic node is comprised of: a main CPU, a power meter, optionally an autonomous photocell, RF modem and optionally a Wi-Fi amplifier station. The electronic nodes may optionally communicate by PLC communication or TP adapter communication unit. The electronic node is connected to the electronic socket. The electronic node, further enables to control a charging driver such as DC pulse width modulation (PWM) power supply etc. The electronic socket is installed at the bottom side of the pole, or on the poles' tray. The electronic socket is used for charging the electronic vehicles.

The electronic node communicates with a main concentrator, which is located at the feeder pillar in the street. The controller communicates with the main Operation and Central Control (OCC) by GPRS communication or TCPIP line. The OCC can be used for municipalities or for High Way, big industrial center, etc.

The OCC manages the consumption of the whole city lighting poles, and the charging services. The OCC sends the bills for payment to the customers which use the electric charging services.

Figure 1:
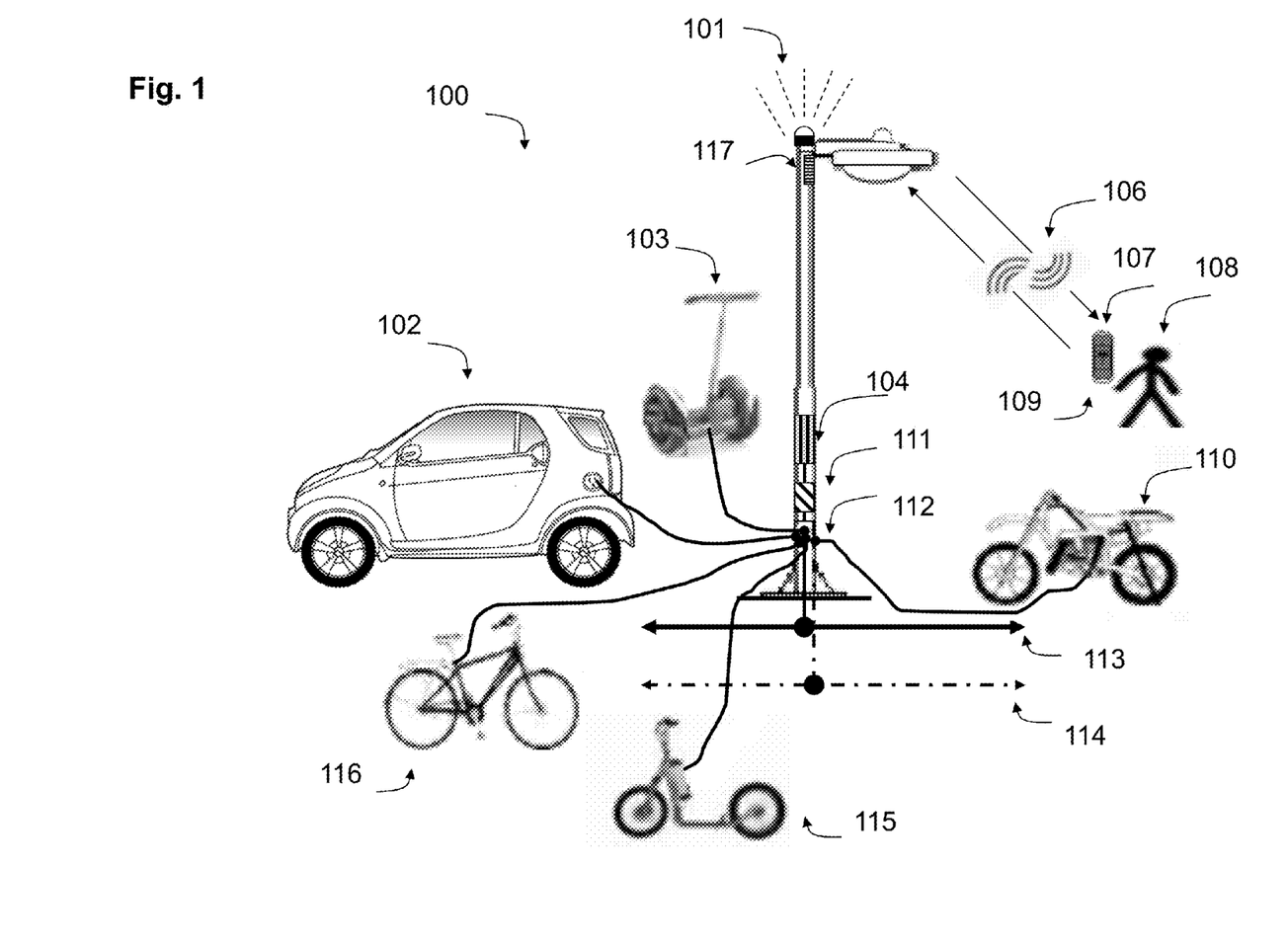
FIG. 1 is a simplified pictorial illustration showing charging of the electrical vehicles through street lighting pole by electrical receptacle.
Figure 3:
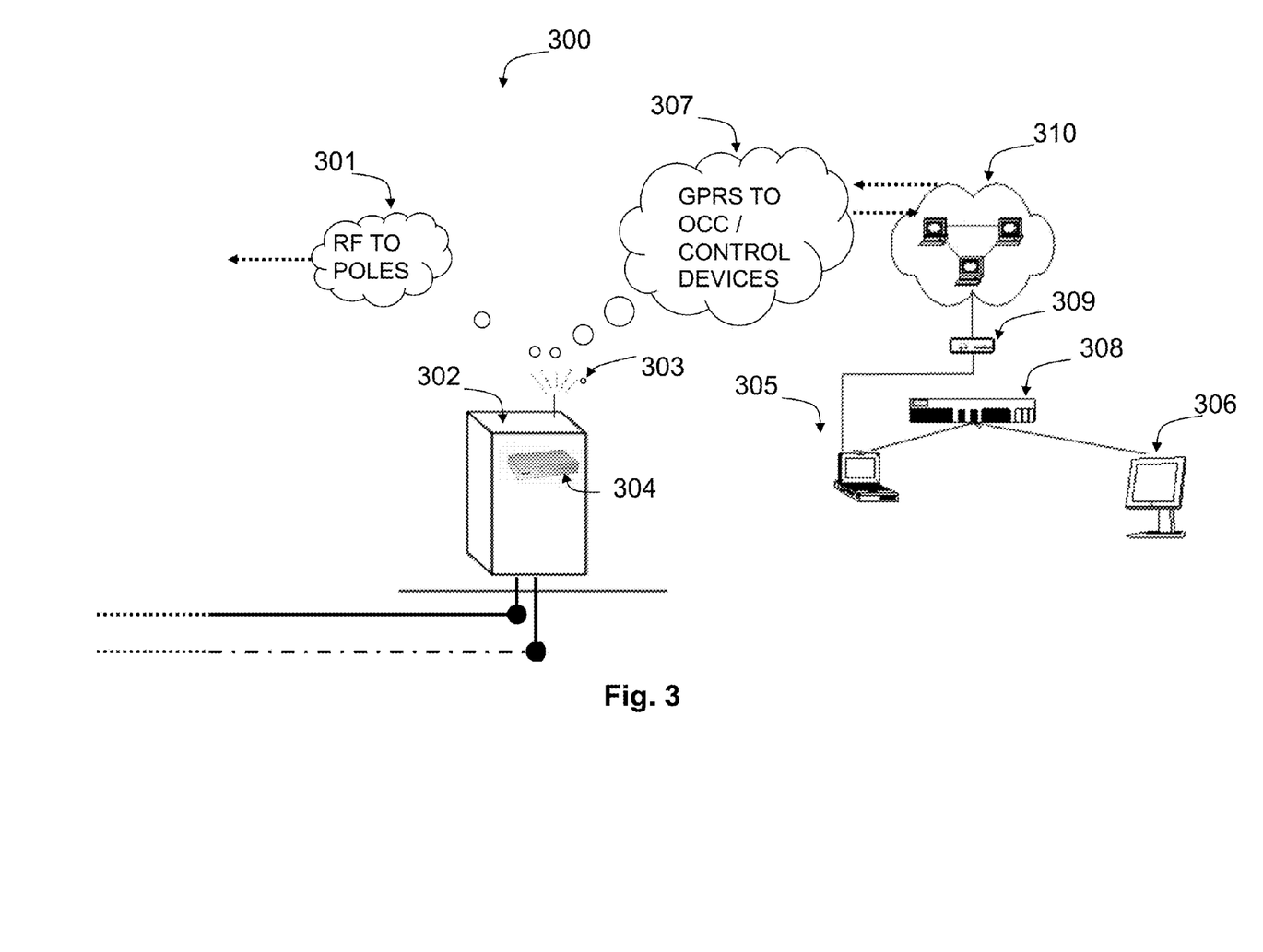
FIG. 3 is a simplified pictorial illustration showing the communication between the LAMPid controller which is located at the feeder pillar to the OCC station by GPRS communication.

Reference is now made to FIG. 1, which is a simplified detailed drawing, illustrating a street light pole 100, which includes electronic (receptacle) socket 112 enabling to connect at least to one electronic powered vehicle such as car 102, Segway 103, Electrical bicycle 116, electrical scooter_115, electrical motorcycle 110. The electronic vehicles are identified by NFC unit 111. The user 108 is able to set his charging quota by communicating with the RF ID unit in the electronic node 101 via cellular phone 109, by RF communication 106, or automatically by the NFC unit 111 which is able to recognize the electronic vehicle ID, through the RFid unit, which is mounted in the vehicles. The charging profile data which is related to specific electronic vehicle are sent to the controller 304 (as shown in FIG. 3) at the feeder pillar 302 by RF communication 101, or TP line 113, or by PLC communication 113, thorough the grid. The charging profile data may include type of vehicle, charging power, charging capacity, average consumption, maintenance data etc. Based on the charging profile data the system determines the precise charging power to be supplied to the specific vehicle.

The street pole 100, is comprised of an electronic ballast 104 for HPS lamps or LED driver 117. The pole is fed from at least 3 phase cables 113, and communicates with the concentrator 306, (as shown in FIG. 3) which installed at the feeder pillar 302, through a one phase PLC unit or by twisted pair communication lines 109. The PLC unit is mounted in the streetlight or on the service tray.

Figure 2:
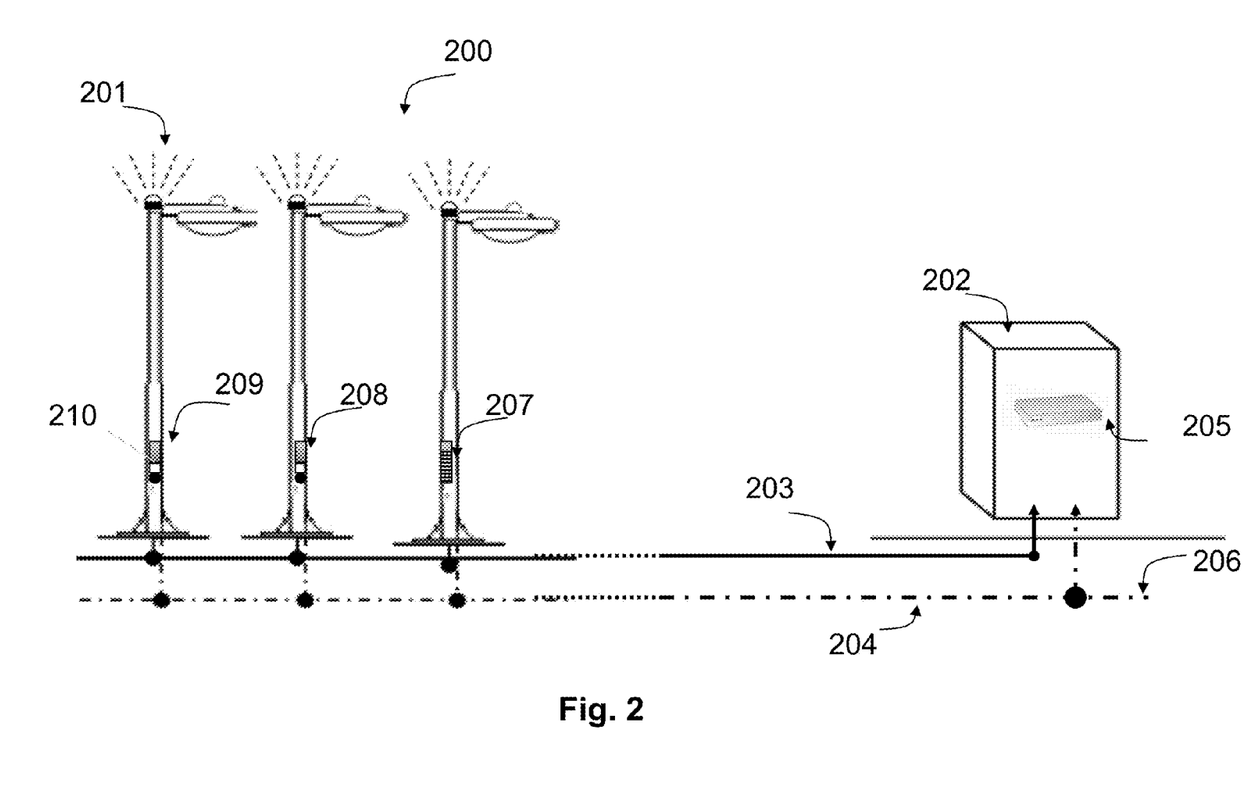
FIG. 2 is a simplified pictorial illustration showing a group of street lighting poles connected to the controller at the feeder pillar.

Reference is now made to FIG. 2 which is a simplified detailed pictorial drawing, illustrating a part of a street light system 200 which includes a group of three poles 201. The communication lines PLC 203 and TP (twisted pair) 204, are optionally connected by the serial connection from the current feeder pillar 202 to the next feeder pillar 205. The OCC controls the supply line of street poles, and select the proper pole for charging according to the power consumption of the whole supply line. Each street pole may include an indicator 210 optionally using a light indicator which changes its color for indicating the status for charging: for example when the light is "GREEN" 209, 208 the electronic socket is "open" and ready for charging an electronic vehicle identified by the NFC system 111 or by the user request (as shown in FIG. 5), while the line is over loaded the OCC will close the electronic socket automatically and the light which is mounted on the pole close to the electronic socket, is switch to "RED" color 207 indicating that the electronic socket is unavailable for charging now.

Reference is now made to FIG. 3, which illustrates the communication configuration between the different components of the system 300 according to some embodiments of the present invention. The GPRS modem which is mounted in the concentrator 304 and enables the communication between the concentrator 304 and the operation control center OCC 310. The concentrator generates the communication to the poles 200 by RF communication 301 or TP line 203 or on the grid by PLC communication 204. The operation control center OCC 310 is comprised of a main server 309 that may be controlled by at least one of: operation officer 305 or by a web station 306.

Figure 4:
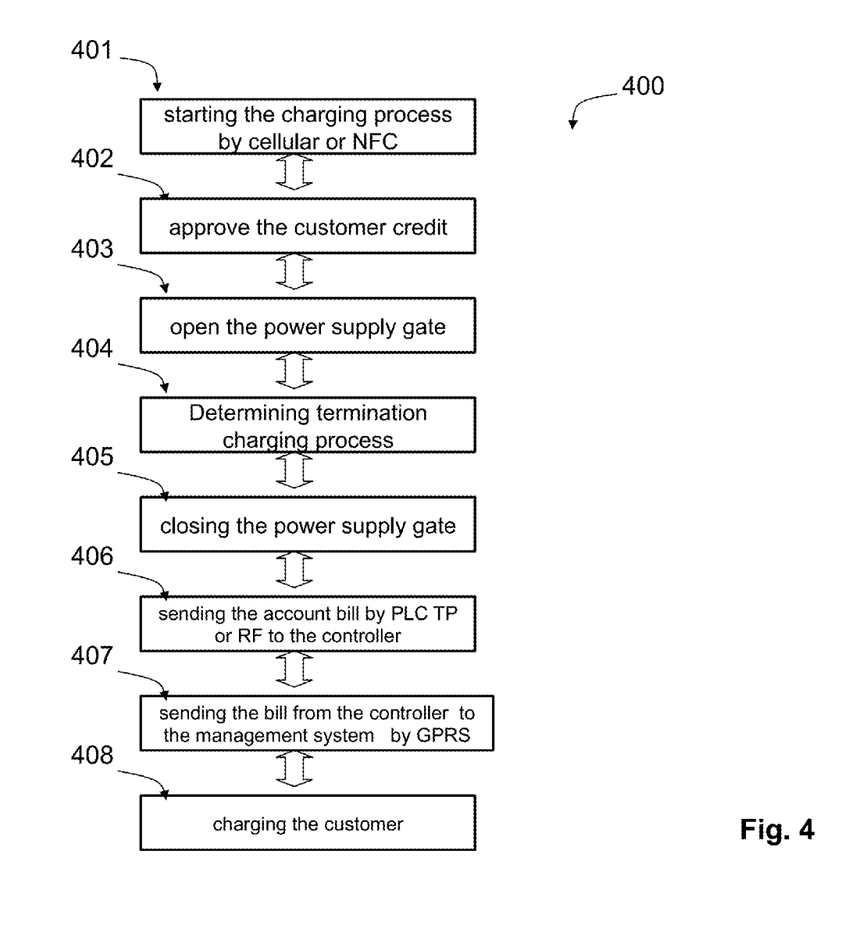
FIG. 4 is a graphical flowchart illustrating the logical process of the charging, according to some embodiments of the present invention.

Reference is now made to FIG. 4 which is a graphical flowchart illustrating the logical process of the charging process 400. The charging process starts with an identification 401, 516, (as shown in FIG. 5) of the user ID, by the near field communication unit NFC 111, or 108 via the cellular 107 of the user. Once the vehicle charging profile is identified including user's credit details 402, the electronic socket 112 is switched on 403. Once the charging process is terminated 404 according predefined conditions or customer decision, the electronic socket gate is switched of 405. The predefined conditions may include defined quanta of power (kilo/vat) or amount of money. The customer consumption report is sent 406 via PLC 113, TP 114, or RF 101 to the concentrator 304 and then by GPRS 511 communication, (as shown in FIG. 5) to the control center 310. The control center 310 charges the customer according to reported consumption and sends customer bill by mail, phone or any other communication means.

Figure 5:
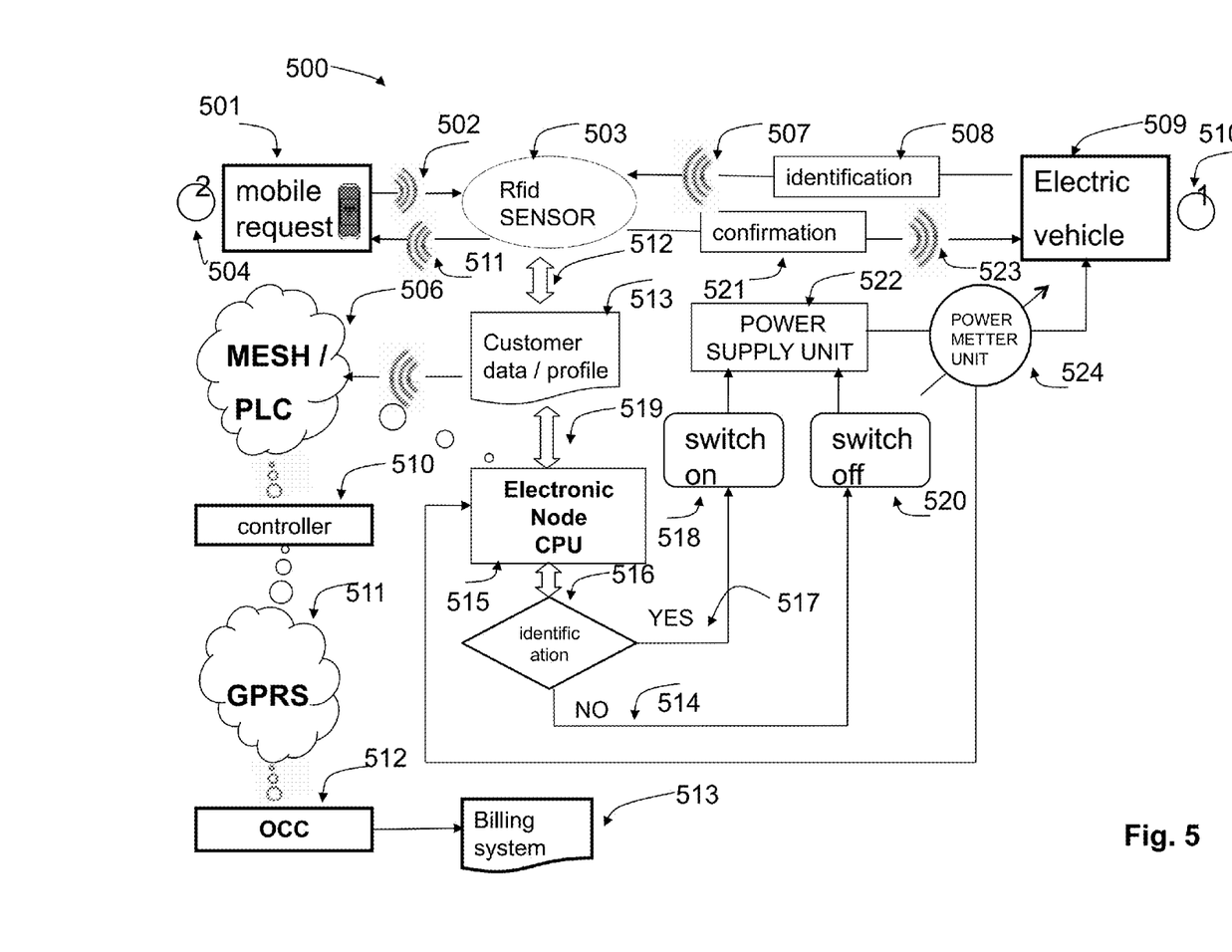
FIG. 5 is a graphical flowchart illustration showing the charging process, according to some embodiments of the present invention.

Reference is now made to FIG. 5 which is a simplified detailed illustration, showing the charging process according to some embodiments of the present invention. Two options are suggested according to the present invention: the first one is a manual 408 request for charging 501 by RF communication 502, 511 via cellular phone 107. The request includes the customer data and/or charging profile 513 and is sent to the CPU 519 located at the RF unit 101.

The CPU 519 starts the identification process 516, and checks the customer credit. In a case of identification error 614, the CPU 519 will switch off 520 the power supply unit 522 and the electronic socket receptacle 112 is closed. When the identification 516 is approved 402, The CPU 519 switches on 518 the power supply unit 522 and the electronic socket receptacle 112 is opened 403 for charging the electronic vehicles. Once the charging process starts the power meter unit 524 measures the power consumption. The CPU 519 sends the customer consumption report 506 via RF 101, PLC 113 or TP 114 to the controller 510, and then the data is sent to the OCC 512 by GPRS communication 511, in order to generate the bill by the electronic billing system 513.

The second option 510 is an automatic request 501, and take place while the electronic vehicles 509 has been identified by the NFC unit 111. Then, the same identification process 508 starts again, in case of identification 517 and the CPU 519 sends an order to switch on 518 the electrical socket 112 and start the charging 522 the electric vehicles 509.

The references cited herein teach many principles that are applicable to the present invention. Therefore the full contents of these publications are incorporated by reference herein where appropriate for teachings of additional or alternative details, features and/or technical background.

It should be understood that the invention is not limited in its application to the details set forth in the description contained herein or illustrated in the drawings. The invention is capable of other embodiments and of being practiced and carried out in various ways. Those skilled in the art will readily appreciate that various modifications and changes can be applied to the embodiments of the invention as hereinbefore described without departing from its scope, defined in and by the appended claims.

The invention claimed is:

1. A system for automatic managing of processes for charging electric vehicles, said system comprising:
    a multiplicity of street light poles connected to a supply line, each of the multiplicity of street light poles comprising a lamp for illuminating a street; a lamp ballast or driver regulating power supplied to the lamp; an electric socket for charging electric vehicles; and an electronic node controlling power consumption of the lamp ballast or driver and power consumption of the electric socket, the electronic node including a communication module;
    a feeder pillar located in the street providing power to the multiplicity of street light poles and communicating with the communication module of the electronic node of each of said street light poles, said feeder pillar comprising a concentrator that controls power consumption and operation of each of said street light poles through the electronic node; and
    an operation control center (OCC) remote server operatively associated with said feeder pillar, said OCC controlling power consumption of each street light pole utilizing the concentrator of the feeder pillar,
    wherein each said electronic node communicates with said concentrator through a first communication network and the feeder pillar communicates with the OCC through a second communication network, which is different than the first communication network,
    wherein said OCC bills a customer of a specific electric vehicle according to the power consumption of the specific electric vehicle, and
    wherein said OCC controls the power consumption of each street light pole and of the supply line based on optimization of the power consumption of the multiplicity of street light poles of the feeder pillar, the OCC controlling the power consumption of each street light pole through controlling and managing said electronic nodes of the street light poles of said feeder pillar by controlling switching on and off of the electric sockets of each of said street light poles for charging and controlling the power consumption of the lamp ballast or driver of each of said street light poles.

2. The system of claim 1, wherein each street light pole of the multiplicity of street light poles further comprises a near field communication (NFC) unit for identifying the specific electric vehicle of the customer.

3. The system of claim 1, wherein the first communication network between the electronic node and the concentrator is one of RF (Radio Frequency) communication, PLC (Power Line Communication) communication or TP (Twisted Pair) communication.

4. The system of claim 3, wherein the second communication network between the concentrator and the OCC is one of: wireless communication, TCPIP (Transmission Control Protocol-Internet Protocol), or wired connection.

5. The system of claim 1, wherein the electronic node sets power parameters according to a vehicle profile associated with the specific electric vehicle of the customer, said power parameters including at least one of: type of vehicle, vehicle charging power, vehicle charging capacity, customer average consumption, and customer maintenance data.

6. The system of claim 1, wherein each electronic node has a unique ID (Identifier).

7. The system of claim 1, wherein the concentrator controls power consumption of each of said street light poles in relation to the charging process.

8. The system of claim 6, wherein each of the multiplicity of street light poles further comprises a DC (Direct Current) power supply controlled by the electronic node of the street light pole.

9. The system of claim 6, wherein the OCC selects a proper one of said street light poles for charging according to the power consumption of the supply line.

10. The system of claim 1 further comprising an indicator module connected to each street light pole indicating whether the electric socket of the street light pole is switched on and off for charging.

11. The system of claim 10, wherein when the supply line is overloaded the OCC switches off the electric socket automatically.

12. The system of claim 10, wherein said indicator module is a light indicator changing its color according to charging status of the electric socket.

13. A method for automatic managing of charging processes of electric vehicles using a system comprising a plurality of street light poles connected to a supply line, each of said plurality of street light poles including an electric socket for charging electric vehicles, a lamp for illuminating a street, and a lamp ballast or driver for regulating power supplied to the lamp; a feeder pillar communicative with said plurality of street light poles; and a control server communicative with said feeder pillar, said method comprising:

identifying a vehicle profile and details of a customer associated with an electric vehicle to be charged;
requesting authorization to charge the electric vehicle, through the control server;
controlling electric charging of the electric vehicle when connected to the electric socket of one of the plurality of street light poles, each of the plurality of street light poles having an electronic node that controls electric charging of electric vehicles therefrom;
managing, controlling and recording power consumption from each street light pole associated to the feeder pillar, wherein the controlling and managing are performed by the control server;
billing each customer according to power consumption thereof; and
controlling, by the control server controlling the electronic nodes, the power consumption of each of said street light poles and of the supply line based on optimization of the power consumption of each of said street light poles through managing and controlling the switching on and off of the electric sockets of each of said street light poles for charging and controlling the power consumption of the lamp ballast or driver of each of said street light poles.

14. The method of claim 13, wherein identifying the vehicle profile comprises identifying the electric vehicle to be charged by using a near field communication (NFC) unit.

15. The method of claim 13, wherein the electronic nodes and the feeder pillar communicate through at least one of: RF (Radio Frequency) communication, PLC (Power Line Communication) or TP (Twisted Pair) communication.

16. The method of claim 13, wherein the feeder pillar and the control server communicate by one of one of wireless communication, TCPIP (Transmission Control Protocol-Internet Protocol), or wired connection.

17. The method of claim 13, wherein the electric node sets power parameters for the electronic vehicle to be charged.

18. The method of claim 13, wherein controlling the power consumption of each street light pole and of the supply line comprises controlling a DC (Direct Current) power supply of each street light pole by the electric node of the street light pole.

19. The method of claim 13, further comprising indicating power consumption status of the electric socket of each said street light pole, said power consumption status represents whether the respective electric socket is switched off for preventing vehicle charging therefrom or switched on for allowing vehicle charging therefrom.

20. The method of claim 13, further comprising selecting, by the control server, one of said street light poles for charging according to the power consumption of the supply line.

* * * * *